US 6,738,877 B1

(12) United States Patent
Yamakawa et al.

(10) Patent No.: US 6,738,877 B1
(45) Date of Patent: May 18, 2004

(54) ACCESS CONTROL METHOD, STORAGE APPARATUS AND STORAGE MEDIUM

(75) Inventors: Teruji Yamakawa, Kanagawa (JP); Kiyomi Imamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/283,123

(22) Filed: Mar. 31, 1999

(30) Foreign Application Priority Data

Apr. 8, 1998 (JP) .......................................... 10-095817

(51) Int. Cl.⁷ .............................................. G06F 12/00
(52) U.S. Cl. ...................... 711/164; 711/163; 713/202
(58) Field of Search ............................ 711/1, 163–164; 709/249; 340/439; 713/202

(56) References Cited

U.S. PATENT DOCUMENTS

| 5,012,514 A | | 4/1991 | Renton ........................ 713/192 |
| 5,058,162 A | | 10/1991 | Santon et al. ................ 711/164 |
| 5,533,125 A | * | 7/1996 | Bensimon et al. ............. 380/4 |
| 5,548,273 A | * | 8/1996 | Nicol et al. ................... 340/439 |
| 5,586,301 A | * | 12/1996 | Fisherman et al. .......... 711/152 |
| 5,881,225 A | * | 3/1999 | Worth ........................ 713/200 |
| 6,006,275 A | * | 12/1999 | Picazo, Jr. et al. ........... 709/249 |
| 6,012,145 A | * | 1/2000 | Mathers et al. .............. 711/164 |
| 6,122,741 A | * | 9/2000 | Patterson et al. ............ 713/200 |
| 6,282,612 B1 | * | 8/2001 | Sakajiri et al. .............. 711/115 |
| 6,286,087 B1 | * | 9/2001 | Ito et al. ...................... 711/164 |

FOREIGN PATENT DOCUMENTS

| JP | 59-226935 | 12/1984 |
| JP | 63-253450 | 10/1988 |
| JP | 2-226456 | 9/1990 |
| JP | 3-91047 | 4/1991 |
| JP | 4-267462 | 9/1992 |
| JP | 5-173891 | 7/1993 |
| JP | 7-121480 | 5/1995 |
| JP | 7-306831 | 11/1995 |
| WO | 95/14265 | 5/1995 |

* cited by examiner

Primary Examiner—Nasser Moazzami
(74) Attorney, Agent, or Firm—Greer, Burns & Crain, Ltd.

(57) ABSTRACT

A storage apparatus which writes information on a portable storage medium in response to a request from at least one host unit is provided with a writing part for writing on the detachable storage medium, a user password and a master password which limit access to the portable storage medium, and an access control part which permits a modification of the user password by specifying the master password, permits access to a data region on the portable storage medium by specifying the user password which is provided in common with respect to a plurality of users, and prohibits at least one of write and read with respect to each of the plurality of users.

23 Claims, 21 Drawing Sheets

FIG. 5

| MASTER PASSWORD | |
|---|---|
| USER PASSWORD | |
| USER NAME a | wtdis |
| USER NAME b | wtdis |
| USER NAME c | wtdis |
| USER NAME d | wtdis |

FIG. 7

| MASTER PASSWORD | |
|---|---|
| USER PASSWORD | |
| USER NAME a | rddis |
| USER NAME b | rddis |
| USER NAME c | rddis |
| USER NAME d | rddis |

FIG. 10

| MASTER PASSWORD | | |
|---|---|---|
| USER PASSWORD | | |
| USER NAME a | rddis | wtdis |
| USER NAME b | rddis | wtdis |
| USER NAME c | rddis | wtdis |
| USER NAME d | rddis | wtdis |

FIG. 11

| MASTER PASSWORD |
|---|
| USER WRITE PASSWORD |
| USER READ PASSWORD |
| USER NAME a |
| USER NAME b |
| USER NAME c |

FIG. 12

| MASTER PASSWORD |
| --- |
| USER WRITE PASSWORD |
| USER NAME a |
| USER NAME b |
| USER NAME c |

FIG. 15

| MASTER PASSWORD | |
|---|---|
| USER PASSWORD | |
| USER NAME a | wtdis |
| USER NAME b | wtdis |
| USER NAME c | wtdis |
| USER NAME d | wtdis |
| PATH INFORMATION | |

FIG. 17

| MASTER PASSWORD | |
|---|---|
| USER PASSWORD | |
| USER NAME a | rddis |
| USER NAME b | rddis |
| USER NAME c | rddis |
| USER NAME d | rddis |
| PATH INFORMATION | |

FIG. 20

| MASTER PASSWORD | | |
|---|---|---|
| USER PASSWORD | | |
| USER NAME a | rddis | wtdis |
| USER NAME b | rddis | wtdis |
| USER NAME c | rddis | wtdis |
| USER NAME d | rddis | wtdis |
| PATH INFORMATION | | |

FIG. 21

| MASTER PASSWORD |
|---|
| USER WRITE PASSWORD |
| USER READ PASSWORD |
| USER NAME a |
| USER NAME b |
| USER NAME c |
| PATH INFORMATION |

FIG. 22

| MASTER PASSWORD |
| --- |
| USER WRITE PASSWORD |
| USER NAME a |
| USER NAME b |
| USER NAME c |
| PATH INFORMATION |

ACCESS CONTROL METHOD, STORAGE APPARATUS AND STORAGE MEDIUM

BACKGROUND OF THE INVENTION

1. Field of the Invention

The present invention generally relates to access control methods, storage apparatuses and storage mediums, and more particularly to an access control method, a storage apparatus and a storage medium for providing security with respect to data stored in the storage medium.

2. Description of the Related Art

Conventionally, portable storage mediums typified by optical disks are designed to achieve high compatibility among storage apparatuses such as optical disk units. Hence, no special mechanism is provided with respect to the security of data and programs stored in the optical disk. For this reason, if an optical disk of an authorized user falls in the hands of an unauthorized user, the unauthorized user can make access to the data and the programs stored in this optical disk. As a result, the unauthorized user may without authorization read the data and the programs from the optical disk or, even rewrite the data and the programs stored in the optical disk.

Accordingly, the conventional optical disk is not provided with a special mechanism with respect to the security of the data and the programs stored in the optical disk, and there were problems in that an unauthorized user may without authorization read the data and the programs from the optical disk or, even rewrite the data and the programs stored in the optical disk.

On the other hand, in the case of portable magnetic disks such as floppy disks, it is known to provide a protection function by storing a password with respect to a document which is stored in the floppy disk, so that an access to the document cannot be made unless the password is input. However, this protection function had the following problems in a case where the floppy disk is used by a plurality of users who use a common computer system, for example. In other words, all of the plurality of users must be informed of the password necessary to make access to the floppy disk, and there were problems in that it is difficult to manage the password, and that the management of the password becomes extremely troublesome and complex when the number or the number of kinds of floppy disks becomes large.

SUMMARY OF THE INVENTION

Accordingly, it is an object of the present invention to provide a novel and useful access control method, storage apparatus and storage medium, in which the problems described above are eliminated.

Another and more specific object of the present invention to provide an access control method, a storage apparatus and a storage medium which can positively prevent unauthorized access to data and programs stored in a portable storage medium such as optical disks, and to enable a relatively simple management of a password, by providing a simple mechanism with respect to the security of the data and the programs stored in the portable storage medium.

Still another object of the present invention is to provide an access control method for a storage apparatus which writes information on a portable storage medium in response to a request from at least one host unit, comprising the steps of writing on the detachable storage medium a user password and a master password which limit access to the portable storage medium, wherein a modification of the user password is permitted by specifying the master password, and said user password is provided in common with respect to a plurality of users and permits access to a data region on the portable storage medium by specifying the user password, and prohibits at least one of write and read with respect to each of the plurality of users. According to the access control method of the present invention, it is possible to positively prevent unauthorized access to data and programs stored in a portable storage medium such as optical disks, and to enable a relatively simple management of a password, by providing a simple mechanism with respect to the security of the data and the programs stored in the portable storage medium.

In the access control method the storage apparatus may be coupled to a plurality of host units via a plurality of paths, path information related to the paths may be added to the user password, and access to the data region on the portable storage medium may be permitted by specifying the user password and the path information.

In the access control method, prohibiting at least one of the write and read may be set independently with respect to each of the plurality of users.

Another object of the present invention is to provide an access control method for a storage apparatus which reads information from a portable storage medium in response to a request from at least one host unit, comprising the steps of reading from the portable storage medium a master password and a user password which limit access to the portable storage medium, wherein a modification of the user password is permitted by specifying the master password, and said user password is provided in common with respect to a plurality of users and permits access to a data region on the portable storage medium by specifying the user password, and prohibits at least one of write and read with respect to each of the plurality of users. According to the access control method of the present invention, it is possible to positively prevent unauthorized access to data and programs stored in a portable storage medium such as optical disks, and to enable a relatively simple management of a password, by providing a simple mechanism with respect to the security of the data and the programs stored in the portable storage medium.

In the access control method, the storage apparatus may be coupled to a plurality of host units via a plurality of paths, path information related to the paths may be added to the user password, and access to the data region on the portable storage medium may be permitted by specifying the user password and the path information.

In the access control method, prohibiting at least one of the write and read may be set independently with respect to each of the plurality of users.

Another object of the present invention is to provide a storage apparatus which writes information on a portable storage medium in response to a request from at least one host unit, comprising a writing unit for writing on the detachable storage medium a user password and a master password which limit access to the portable storage medium; and an access control part which permits a modification of the user password by specifying the master password, permits access to a data region on the portable storage medium by specifying the user password which is provided in common with respect to a plurality of users, and prohibits at least one of write and read with respect to each of the plurality of users. According to the storage apparatus of the present invention, it is possible to positively prevent unauthorized access to data and programs stored in a portable storage medium such as optical disks, and to enable a relatively simple management of a password, by providing a simple mechanism with respect to the security of the data and the programs stored in the portable storage medium.

In the storage apparatus, the storage apparatus may be coupled to a plurality of host units via a plurality of paths, path information related to the paths may be added to the user password, and access to the data region on the portable storage medium may be permitted by specifying the user password and the path information.

In the storage apparatus, prohibiting at least one of the write and read may be set independently with respect to each of the plurality of users.

Still another object of the present invention is to provide a storage apparatus which reads information from a portable storage medium in response to a request from at least one host unit, comprising a reading unit for reading from the portable storage medium a master password and a user password which limit access to the portable storage medium; and an access control part which permits a modification of the user password by specifying the master password, permits access to a data region on the portable storage medium by specifying the user password which is provided in common with respect to a plurality of users, and prohibits at least one of write and read with respect to each of the plurality of users. According to the storage apparatus of the present invention, it is possible to positively prevent unauthorized access to data and programs stored in a portable storage medium such as optical disks, and to enable a relatively simple management of a password, by providing a simple mechanism with respect to the security of the data and the programs stored in the portable storage medium.

In the storage apparatus, the storage apparatus may be coupled to a plurality of host units via a plurality of paths, path information related to the paths may be added to the user password, and access to the data region on the portable storage medium may be permitted by specifying the user password and the path information.

In the storage apparatus, prohibiting at least one of the write and read may be set independently with respect to each of the plurality of users.

A further object of the present invention is to provide a storage medium comprising a data region storing data; and a region other than said data region, storing a master password and a user password which limit access to the storage medium, wherein the master password is provided to permit a modification of the user password by specifying the master password, and the user password is provided in common with respect to a plurality of users and permits access to a data region on the storage medium by specifying the user password, and prohibits at least one of write and read with respect to each of the plurality of users. According to the storage medium of the present invention, it is possible to positively prevent unauthorized access to data and programs stored in a portable storage medium such as optical disks, and to enable a relatively simple management of a password, by providing a simple mechanism with respect to the security of the data and the programs stored in the portable storage medium.

In the storage medium, path information related to a path may be added to the user password, and the user password and the path information may be provided to permit access to said data region by specifying the user password and the path information.

In the storage medium, prohibiting at least one of the write and read may be set independently with respect to each of the plurality of users.

Other objects and further features of the present invention will be apparent from the following detailed description when read in conjunction with the accompanying drawings.

BRIEF DESCRIPTION OF THE DRAWINGS

FIG. 5 is a diagram for explaining a format of a master password, a user password and a user name list;

FIG. 7 is a diagram for explaining a format of the master password, the user password and the user name list;

FIG. 10 is a diagram for explaining a first modification of the format of the master password, the user password and the user name list;

FIG. 11 is a diagram for explaining a second modification of the format of the master password, the user password and the user name list;

FIG. 12 is a diagram for explaining a third modification of the format of the master password, the user password and the user name list;

FIG. 15 is a diagram for explaining a format of a master password, a user password and a user name list;

FIG. 17 is a diagram for explaining a format of the master password, the user password and the user name list;

FIG. 20 is a diagram for explaining a first modification of the format of the master password, the user password and the user name list;

FIG. 21 is a diagram for explaining a second modification of the format of the master password, the user password and the user name list; and FIG. 22 is a diagram for explaining a third modification of the format of the master password, the user password and the user name list.

DESCRIPTION OF THE PREFERRED EMBODIMENTS

Figure 1:
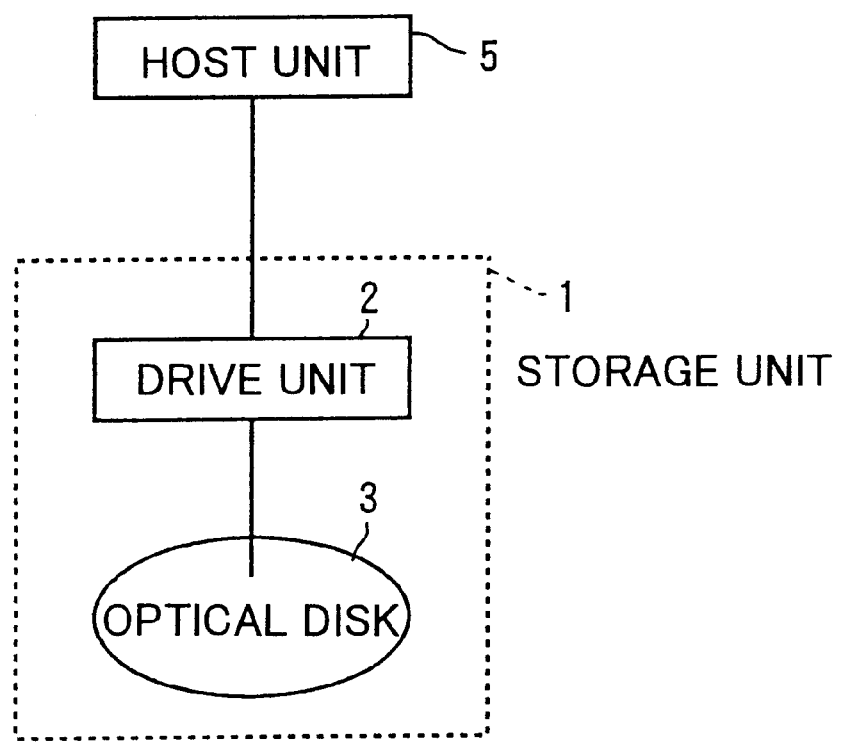
FIG. 1 is a system block diagram showing a first embodiment of a storage apparatus according to the present invention.

FIG. 1 is a system block diagram showing a first embodiment of a storage apparatus according to the present invention. This first embodiment of the storage apparatus employs a first embodiment of an access control method according to the present invention, and creates a first embodiment of a storage medium according to the present invention. In this embodiment, the present invention is applied to an optical disk unit which writes information on and/or reads information from an optical disk, that is, read/write information with respect to the optical disk.

A storage apparatus 1 is made up of a drive unit 2, and an optical disk 3 is inserted with respect to the drive unit 2 as a portable storage medium. This storage apparatus 1 is provided as an auxiliary storage apparatus of a host unit 5, and the drive unit 2 writes data in the optical disk 3 and reads data from the optical disk 3, in response to an instruction from the host unit 5. The host unit 5 is made up of a known personal computer which is made up of a keyboard, a display part, a main body part and the like.

Figure 2:
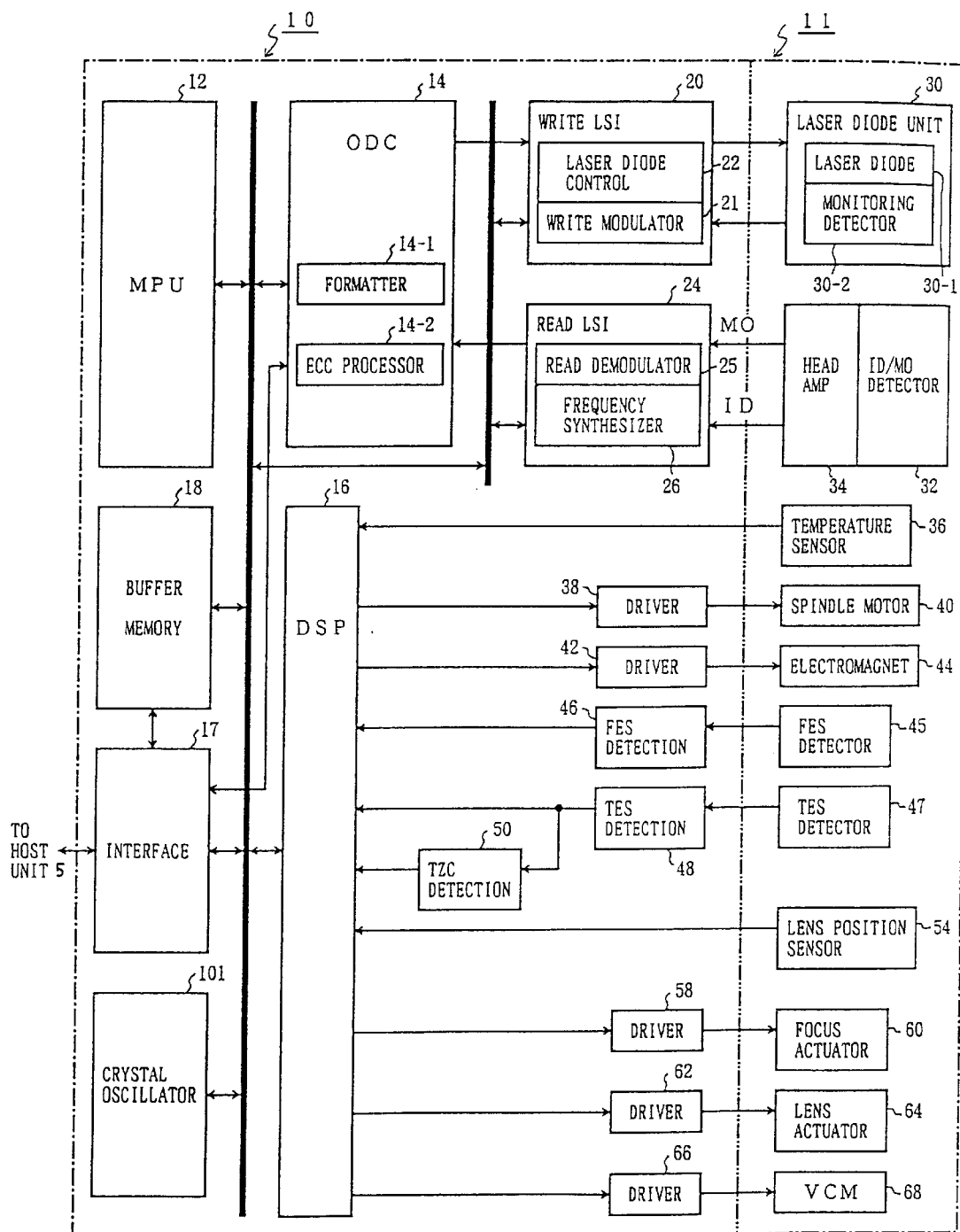
FIG. 2 is a system block diagram showing an embodiment of the construction of a drive unit.

FIG. 2 is a system block diagram showing an embodiment of the construction of the drive unit 2. As shown in FIG. 2, the drive unit 2 generally includes a control unit 10 and an enclosure 11. The control unit 10 includes a microprocessor unit (MPU) 12 which generally controls the operation of the optical disk unit, an interface 17 which exchanges commands and data between the host unit 5, an optical disk controller (ODC) 14 which carries out processes required to read/write data with respect to the optical disk 3, a digital signal processor (DSP) 16, and a buffer memory 18. The buffer memory 18 is used in common by the MPU 12, the ODC 14 and the interface 17, and includes dynamic random access memory (DRAM), for example. A crystal oscillator 101 is coupled to the MPU 12.

The ODC 14 includes a formatter 14-1 and error correction code (ECC) processor 14-2. At the time of a write access, the formatter 14-1 divides NRZ write data into sector units of the optical disk 3 and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1-7 run length limited (RLL) code, for example.

At the time of a read access, a reverse conversion of the 1-7 RLL is carried out with respect to the sector data, and after carrying out the CRC, the error detection and error correction using the ECC are carried out in the ECC processor 14-2. Further, the NRZ data in sector units are connected in the formatter 14-2 so as to transfer a NRZ read data stream to the host unit 5.

A write large scale integrated (LSI) circuit 20 is provided with respect to the ODC 14. This write LSI 20 includes a write modulator 21 and a laser diode control circuit 22. A control output of the laser diode control circuit 22 is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse width modulation (PWM) recording (or edge recording).

When recording and reproducing data with respect to the optical disk 3 using the laser diode unit 30, this embodiment can use any one of writable magneto-optical (MO) cartridge mediums having the storage capacities of 128 MB, 230 MB, 540 MB and 640 MB. In the MO cartridge mediums having the storage capacities of 128 MB and 230 MB, the PPM recording is employed to record the data in correspondence with the existence and non-existence of marks on the optical disk 3. In addition, a zone constant angular velocity (CAV) is used as the recording format of the optical disk 3, where 1 zone is provided as a user region in the case of the optical disk having the storage capacity of 128 MB and 10 zones are provided as the user region in the case of the optical disk having the storage capacity of 230 MB.

In the MO cartridge mediums having the storage capacities of 540 MB and 640 MB and used for the high density recording, the PWM recording is employed to record the data in correspondence with the edges of the marks, that is, leading and trailing edges, on the optical disk 3. The difference between the storage capacities of the optical disk having the storage capacity of 540 MB and the optical disk having the storage capacity of 640 MB is due to the different sector capacities. The optical disk ha the storage capacity of 540 MB if the sector capacity is 512 bytes, and the optical disk has the storage capacity of 640 MB if the sector capacity is 2048 bytes. In addition, the zone CAV is used as the recording format of the optical disk 3, where 18 zones are provided as the user region in the case of the optical disk having the storage capacity of 540 MB and 11 zones are provided as the user region in the case of the optical disk having the storage capacity of 640 MB.

Hence, this embodiment can cope with the optical disks having the storage capacities of 128 MB, 230 MB, 540 MB and 640 MB, and also cope with direct overwrite type optical disks having the storage capacities of 230 MB, 540 MB and 640 MB. Accordingly, when the optical disk 3 is loaded into the storage apparatus 1, an identification (ID) part of the optical disk 3 is first read so as to recognize the type of the optical disk 3 by the MPU 12 from the intervals of the pits, and a recognition result of the type of the loaded optical disk 3 is notified to the ODC 14.

A read LSI circuit 24 is provided as a read system with respect to the ODC 14. A read demodulator 25 and a frequency synthesizer 26 are provided in the read LSI circuit 24. An ID/MO detector 32 of the enclosure 11 detects a laser beam emitted from the laser diode 30-1 and returned via the optical disk 3, and a detection signal from this ID/MO detector 32 is input as an ID signal and a MO signal to the read LSI circuit 24 via a head amplifier 34.

The read demodulator 25 of the read LSI circuit 24 includes the functions of circuits such as an automatic gain control (AGC) circuit, a filter and a sector mark detection circuit. Hence, the read demodulator 25 generates a read clock and a read data from the input ID signal and MO signal, and demodulates the PPM data or the PWM data back into the original NRZ data. In addition, since the zone CAV is employed, the MPU 12 controls a setting of a frequency dividing ratio with respect to the frequency synthesizer 26 of the read LSI circuit 24 in order to generate a clock frequency in correspondence with the zone.

The frequency synthesizer 26 is a phase locked loop (PLL) circuit having a programmable frequency divider, and generates as a read clock a reference clock having a predetermined specific frequency depending on the zone position on the optical disk 3. In other words, the frequency synthesizer 26 is formed by the PLL circuit having the programmable frequency divider, and generates the reference clock having a frequency fo based on fo=(m/n)·fi according to a frequency dividing ratio m/n which is set by the MPU 12 depending on a zone number.

A denominator n of the frequency dividing ratio m/n is a specific value depending on the type of optical disk 3 having the storage capacity of 128 MB, 230 MB, 540 MB or 640

MB. In addition, a numerator m of the frequency dividing ratio m/n is a value which changes depending on the zone position on the optical disk 3, and table information of the values corresponding to the zone numbers are prepared in advance with respect to each type of optical disk. Moreover, fi denotes a reference clock frequency generated outside the frequency synthesizer 26.

The read data demodulated in the read LSI circuit 24 is supplied to the read system of the ODC 14, and after carrying out the reverse conversion of the 1-7 RLL, the CRC and the ECC processes are carried out by the encoding function of the ECC processor 14-2 so as to restore the original NRZ data. Next, the formatter 14-1 connects and converts the NRZ sector data into the NRZ read data stream, and this NRZ read data stream is transferred to the host unit 5 via the buffer memory 18 and the interface 17.

A detection signal from a temperature sensor 36 provided in the enclosure 11 is supplied with respect to the MPU 12 via the DSP 16. Based on an environmental temperature within the optical disk unit 1 detected by the temperature sensor 36, the MPU 12 controls the light emission powers for the read, write and erase in the laser diode control circuit 22.

The MPU 12 controls a spindle motor 40 provided in the enclosure 11 via the DSP 16 and a driver 38. In this embodiment, since the zone CAV is employed as the recording format of the optical disk 3, the spindle motor 40 is rotated at a constant speed of 3000 rpm, for example.

In addition, the MPU 12 controls an electromagnet 44 provided in the enclosure 11 via the DSP 16 and a driver 42. The electromagnet 44 is arranged on a side opposite to the side of the optical disk 3 on which the laser beam is irradiated within the optical disk unit 1 which is loaded with this optical disk 3. This electromagnet 44 supplies an external magnetic field on the optical disk 3 at the time of the recording and erasure.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is provided in the optical unit of the enclosure 11 so as to detect the laser beam emitted from the laser diode 30-1 and returned via the optical disk 3. A FES detection circuit 46 generates a FES El from a detection signal received from the FES detector 45, and inputs this FES El to the DSP 16.

A tracking error signal (TES) detector 47 is also provided in the optical unit of the enclosure 11 so as to detect the laser beam emitted from the laser diode 30-1 and returned via the optical disk 3. A TES detection circuit 48 generates a TES E2 from a detection signal received from the TES detector 47, and inputs this TES E2 to the DSP 16. The TES E2 is also input to a track zero crossing (TZC) detection circuit 50, and this TZC detection circuit 50 generates a TZC signal E3 which is input to the DSP 16.

A lens position sensor 52 is provided in the enclosure 11. This lens position sensor 52 detects a position of an objective lens through which the laser beam is irradiated on the optical disk 3. A lens position detection signal (LPOS) E4 from the lens position sensor 52 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk 3.

Figure 3:
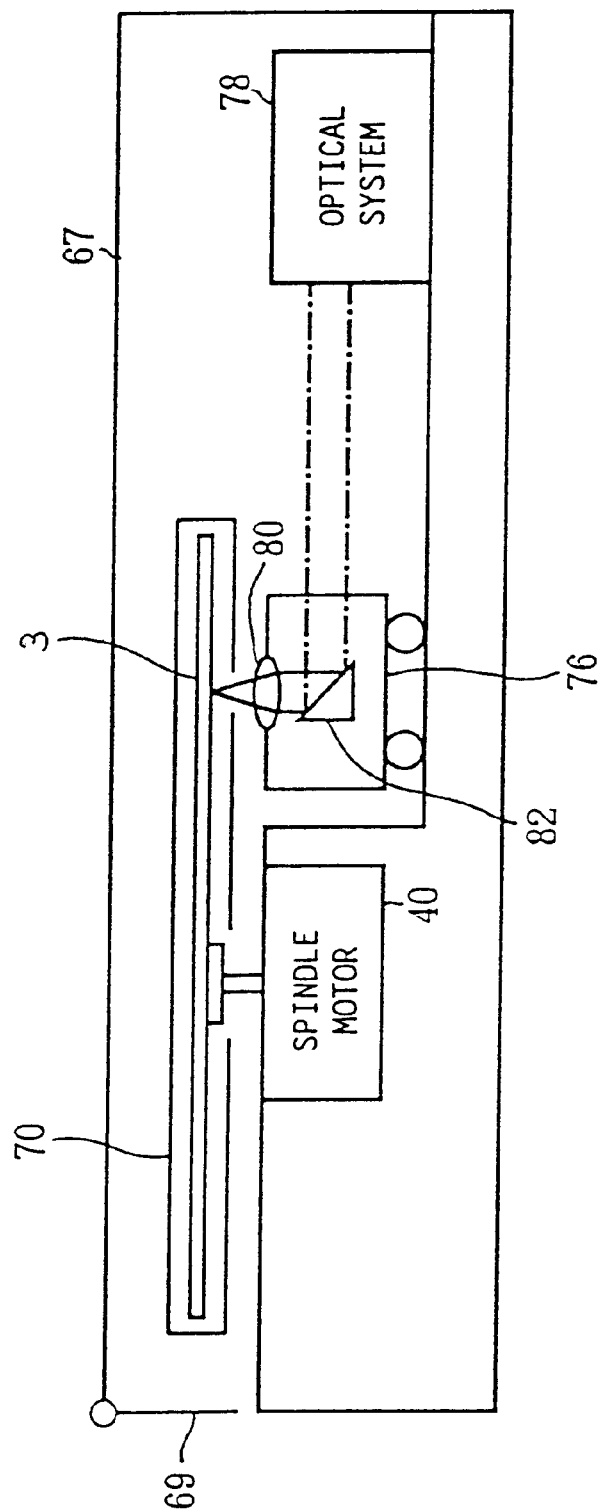
FIG. 3 is a cross sectional view showing the general construction of an enclosure.

FIG. 3 is a cross sectional view showing the general construction of the enclosure 11. As shown in FIG. 3, the spindle motor 40 is provided within a housing 67. By inserting a MO cartridge 70 into the housing 67 from the side of an inlet door 69, the optical disk (MO disk) 3 accommodated within the MO cartridge 70 engages a rotary shaft of the spindle motor 40, thereby loading the optical disk 3 with respect to the optical disk unit 1.

A carriage 76 is provided below the optical disk 3 within the loaded MO cartridge 70. This carriage 76 is freely movable in a direction which traverses tracks on the optical disk 3 when driven by the VCM 64. An objective lens 80 is mounted on the carriage 76. The laser beam emitted from the laser diode 30-1 which is provided within a fixed optical system 78 is reflected by a mirror 82, and is irradiated on the recording surface of the optical disk 3 via the objective lens 80, thereby forming a beam spot on the recording surface. The movement of the objective lens 80 along an optical axis is controlled by the focus actuator 60 of the enclosure 11 shown in FIG. 2. In addition, the objective lens 80 is movable in a radial direction which traverses the tracks on the optical disk 3 by the lens actuator 64, within a range of several tens of tracks. The position of the objective lens 80 mounted on the carriage 76 is detected by the lens position sensor 54 shown in FIG. 2. The lens position sensor 54 outputs the lens position detection signal E4 which takes a value zero at a neutral position where the optical axis of the objective lens 80 is perpendicular to the recording surface of the optical disk 3, and has a magnitude and a polarity depending on the amount the optical axis of the objective lens 80 moves towards the inner or outer peripheral side of the optical disk 3.

Figure 4:
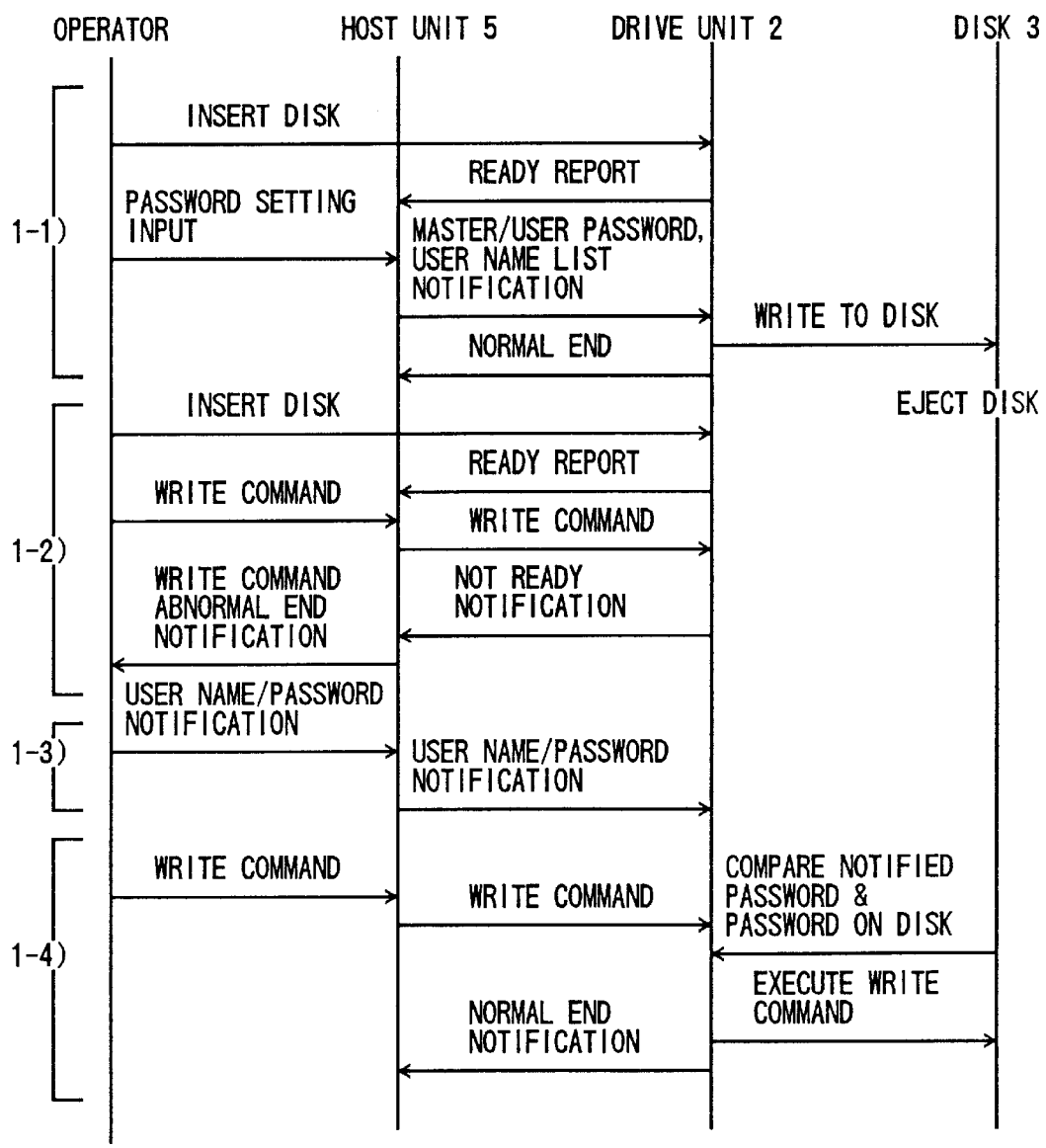
FIG. 4 is a time chart for explaining the operation of the first embodiment when carrying out a write operation.

Next, a description will be given of the operation of this embodiment during a write operation. FIG. 4 is a time chart for explaining the operation of this embodiment during the write operation. In FIG. 4, 1-1) shows a password setting operation, 1-2) shows an operation for a case where a write command is issued before the passwords are notified, 1-3) shows a password notifying operation, and 1-4) shows an operation for a case where the write command is issued after the passwords are notified.

1-1) Password Setting Operation

When an operator inserts the optical disk 3 into the drive unit 2, the drive unit 2 supplies to the host unit 5 a ready signal which reports a ready state of the drive unit 2. When the operator confirms the ready state of the drive unit 2 on the host unit 5, the operator makes a password setting input. When making this password setting input, a security command for adding user information to a password is issued, and information such as a master password, a user password and a user name list is input. The host unit 5 issues the security command, and supplies to the drive unit 2 the master password, the user password, the user name list and the like which are input. As a result, the drive unit 2 writes the master password, the user password, the user name list and the like in the like in a region of the optical disk 3 other than a data region of the optical disk 3, and then reports a command normal end to the host unit 5. Thereafter, the optical disk 3 is ejected outside the storage apparatus 1 in response to an instruction from the operator or the host unit 5, for example.

The master password is provided to limit access to the optical disk 3, and a modification of the user password is permitted by specifying the master password. In addition, the user password is provided in common with respect to a plurality of users, and access to the data region of the optical disk 3 is permitted by specifying this user password. Prohibiting a write operation with respect to the data region is set with respect to each of the plurality of users.

FIG. 5 is a diagram for explaining a format of the master password, the user password and the user name list used in this embodiment. As shown in FIG. 5, the master password and the user password are provided in common with respect to users a, b, c and d. In addition, the user password includes the user name list, and a write prohibit flag (write disable flag) wtdis is set with respect to each of the user names a through d. For example, the write prohibit flag wtdis is set to "1" with respect to the user who is to be prohibited from writing to the data region. Of course, the number of users is not limited to four.

1-2) Operation For A Case Where A Write Command Is Issued Before Passwords Are Notified When the operator inserts the optical disk 3 into the drive unit 2, the drive unit 2 supplies to the host unit 5 a ready signal which reports a ready state of the drive unit 2. When the operator confirms the ready state of the drive unit 2 on the host unit 5, the operator inputs a write command. As a result, the host unit 5 issues and supplies a write command to the drive unit 2. However, in this case, the passwords are not yet notified to the drive unit 2, and thus, the drive unit 2 notifies a not ready signal (abnormal end) to the host unit 5 with respect to the write command. As a result, the host unit 5 makes a write command abnormal end notification with respect to the operator by displaying a message, for example.

1-3) Password Notifying Operation

The operator inputs the master password, the user password and the user name from the keyboard of the host unit 5, for example. The host unit 5 notifies to the drive unit 2 the master password, the user password and the user name which are input. If the operator is the user b, for example, the user name b is input to the host unit 5 together with the master password and the user password.

1-4) Operation For A Case Where A Write Command Is Issued After Passwords Are Notified As described above under 1-2), when the operator inserts the optical disk 3 into the drive unit 2, the drive unit 2 supplies to the host unit 5 a ready signal which reports a ready state of the drive unit 2. When the operator confirms the ready state of the drive unit 2 on the host unit 5, the operator inputs a write command. As a result, the host unit 5 issues and supplies a write command to the drive unit 2. In this case, the passwords are already notified to the drive unit 2 by the operation described above under 1-3). Thus, the drive unit 2 compares the already notified passwords and the passwords read from the optical disk 3 to determine whether or not the passwords match, in response to the write command. If the compared passwords match and no write prohibit is set, a write operation based on the write command is carried out with respect to the data region of the optical disk 3, and a command normal end is reported to the host unit 5. The comparison of the passwords includes a comparison of the master passwords, and a comparison of the user passwords. If the compared master passwords match and the compared user passwords match, a decision is made as to whether or not the write prohibit flag wtdis with respect to the user name is "0", and the write operation is permitted if the write prohibit flag wtdis is "0", while the write operation is prohibited if the write prohibit flag wtdis is "1".

Figure 6:
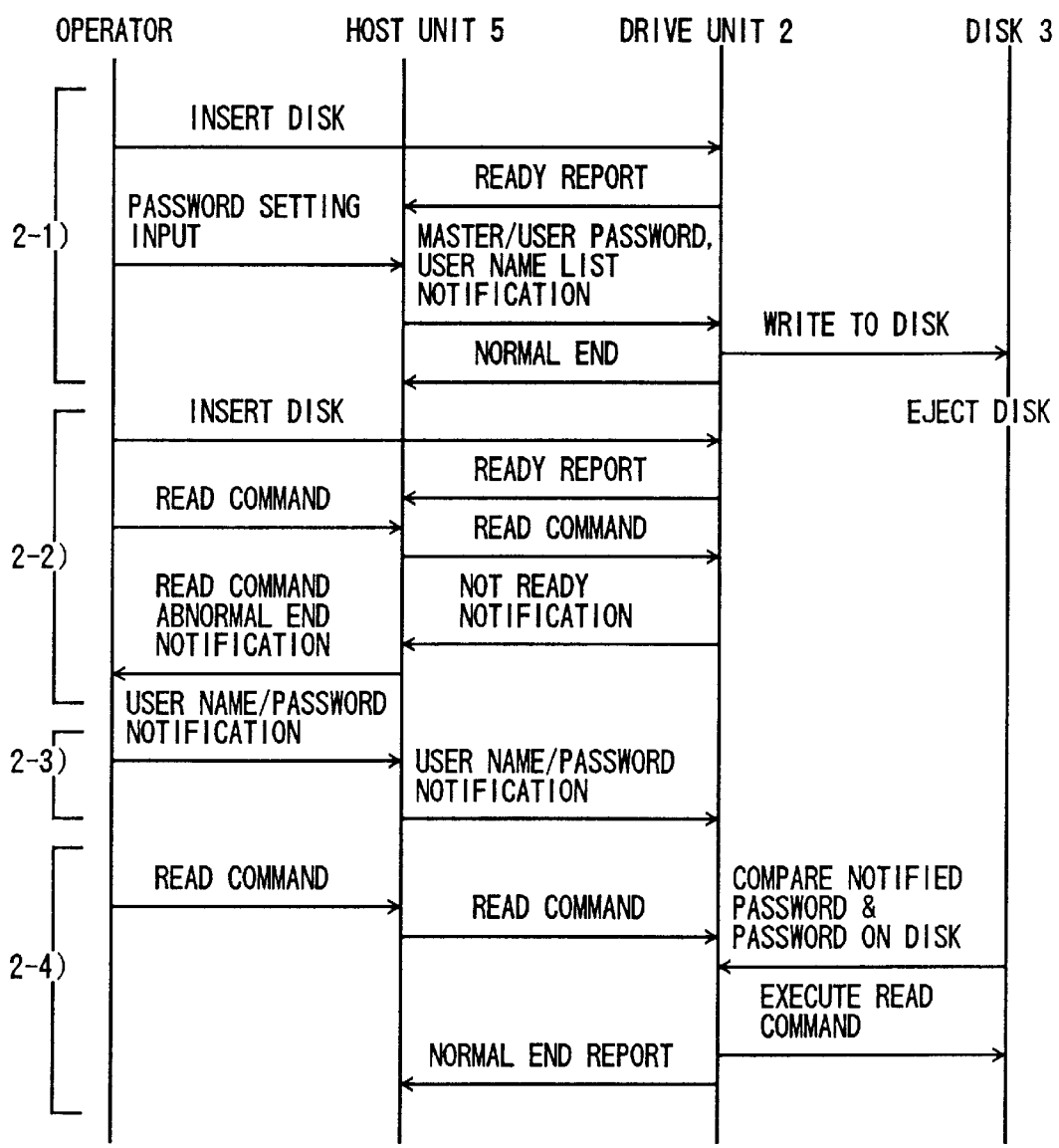
FIG. 6 is a time chart for explaining the operation of the first embodiment when carrying out a read operation.

Next, a description will be given of the operation of this embodiment during a read operation. FIG. 6 is a time chart for explaining the operation of this embodiment during the read operation. In FIG. 6, 2-1) shows a password setting operation, 2-2) shows an operation for a case where a read command is issued before the passwords are notified, 2-3) shows a password notifying operation, and 2-4) shows an operation for a case where the read command is issued after the passwords are notified.

2-1) Password Setting Operation

When an operator inserts the optical disk 3 into the drive unit 2, the drive unit 2 supplies to the host unit 5 a ready signal which reports a ready state of the drive unit 2. When the operator confirms the ready state of the drive unit 2 on the host unit 5, the operator makes a password setting input. When making this password setting input, a security command for adding user information to a password is issued, and information such as a master password, a user password and a user name list is input. The host unit 5 issues the security command, and supplies to the drive unit 2 the master password, the user password, the user name list and the like which are input. As a result, the drive unit 2 writes the master password, the user password, the user name list and the like in a region of the optical disk 3 other than a data region of the optical disk 3, and then reports a command normal end to the host unit 5. Thereafter, the optical disk 3 is ejected outside the storage apparatus 1 in response to an instruction from the operator or the host unit 5, for example.

The master password is provided to limit access to the optical disk 3, and a modification of the user password is permitted by specifying the master password. In addition, the user password is provided in common with respect to a plurality of users, and access to the data region of the optical disk 3 is permitted by specifying this user password. Prohibiting a read operation with respect to the data region is set with respect to each of the plurality of users.

FIG. 7 is a diagram for explaining a format of the master password, the user password and the user name list used in this embodiment. As shown in FIG. 7, the master password and the user password are provided in common with respect to users a, b, c and d. In addition, the user password includes the user name list, and a read prohibit flag (read disable flag) rddis is set with respect to each of the user names a through d. For example, the read prohibit flag rddis is set to "1" with respect to the user who is to be prohibited from reading from the data region. Of course, the number of users is not limited to four.

2-2) Operation For A Case Where A Read Command Is Issued Before Passwords Are Notified When the operator inserts the optical disk 3 into the drive unit 2, the drive unit 2 supplies to the host unit 5 a ready signal which reports a ready state of the drive unit 2. When the operator confirms the ready state of the drive unit 2 on the host unit 5, the operator inputs a read command. As a result, the host unit 5 issues and supplies a read command to the drive unit 2. However, in this case, the passwords are not yet notified to the drive unit 2, and thus, the drive unit 2 notifies a not ready signal (abnormal end) to the host unit 5 with respect to the read command. As a result, the host unit 5 makes a read command abnormal end notification with respect to the operator by displaying a message, for example.

2-3) Password Notifying Operation

The operator inputs the master password, the user password and the user name from the keyboard of the host unit 5, for example. The host unit 5 notifies to the drive unit 2 the master password, the user password and the user name which are input. If the operator is the user b, for example, the user name b is input to the host unit 5 together with the master password and the user password.

2-4) Operation For A Case Where A Read Command Is Issued After Passwords Are Notified As described above under 2-2), when the operator inserts the optical disk 3 into the drive unit 2, the drive unit 2 supplies to the host unit 5 a ready signal which reports a ready state of the drive unit 2. When the operator confirms the ready state of the drive unit 2 on the host unit 5, the operator inputs a read command. As a result, the host unit 5 issues and supplies a read command to the drive unit 2. In this case, the passwords are already notified to the drive unit 2 by the operation described above under 2-3). Thus, the drive unit 2 compares the already notified passwords and the passwords read from the optical disk 3 to determine whether or not the passwords match, in response to the read command. If the compared passwords match and no read prohibit is set, a read operation based on the read command is carried out with respect to the data region of the optical disk 3, and a command normal end is reported to the host unit 5. The comparison of the passwords includes a comparison of the master passwords, and a comparison of the user passwords. If the compared master passwords match and the compared user passwords match, a decision is made as to whether or not the read prohibit flag rddis with respect to the user name is "0", and the read operation is permitted if the read prohibit flag rddis is "0", while the read operation is prohibited if the read prohibit flag rddis is "1".

Figure 8:
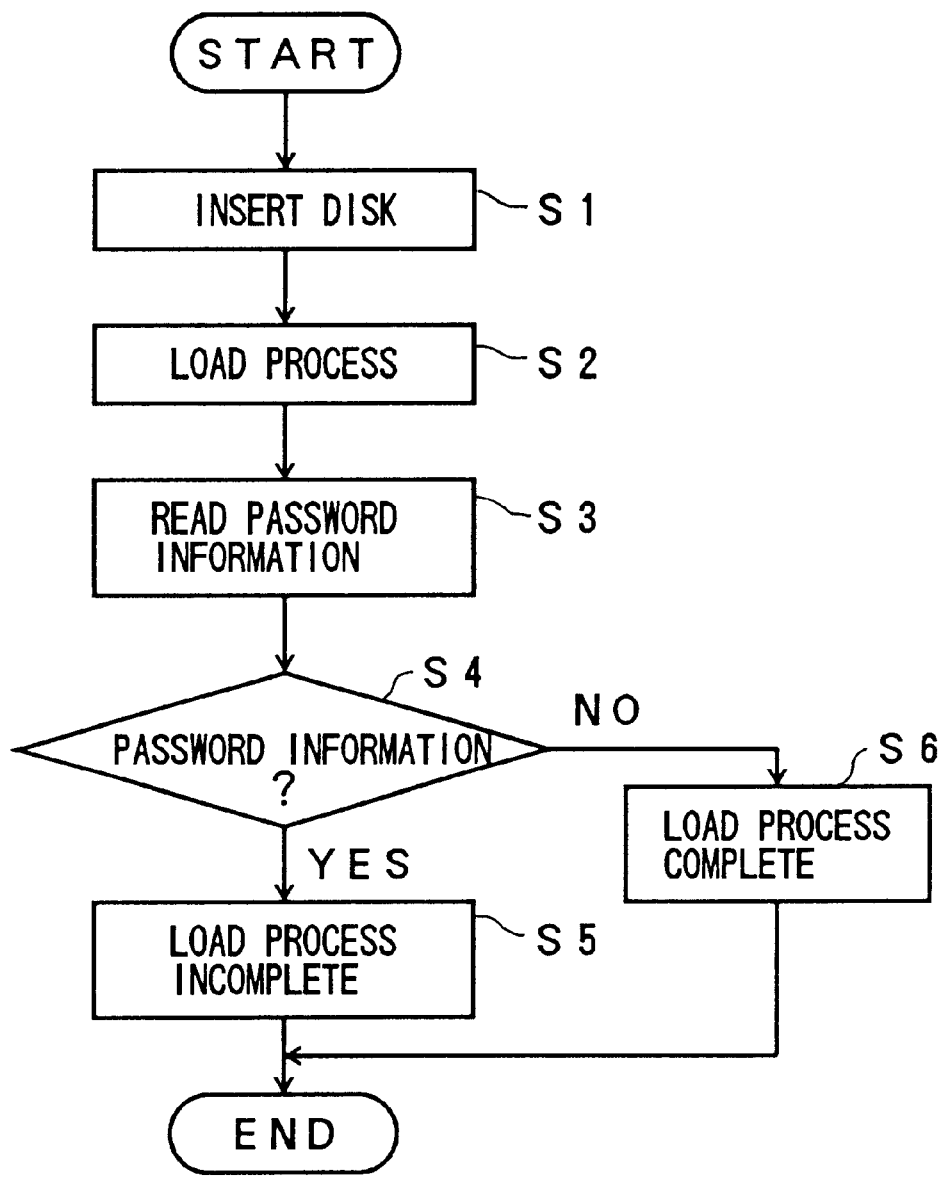
FIG. 8 is a flow chart for explaining the operation when inserting an optical disk into the storage apparatus.

FIG. 8 is a flow chart for explaining the operation of this embodiment when inserting the optical disk 3 into the storage apparatus 1.

In FIG. 8, the operator inserts the optical disk 3 into the storage apparatus 1 in a step S1, and a step S2 starts a load process with respect to the optical disk 3 under a control of the MPU 12. In a step S3, the MPU 12 reads password information from the optical disk 3 via the read LSI 24 and the ODC 14. The read password information is registered in a memory such as the buffer memory 18, a RAM within the MPU 12 or the like, and this read password information is regarded valid until the optical disk 3 is unloaded or until the power of the storage apparatus 1 is turned OFF. In other words, by reading and setting the password information at the initial loading process, it thereafter becomes only necessary to access the memory such as the RAM to obtain the password information. The password information includes the master password, the user password, the user name list and the like described above. In a step S4, the MPU 12 decides whether or not the password information is read from the optical disk 3. If the decision result in the step S4 is YES, the MPU 12 sets in a step S5 information which indicates that the load process with respect to the optical disk 3 is incomplete, and the process ends. On the other hand, if the decision result in the step S4 is NO, the MPU 12 sets in a step S6 information which indicates that the load process with respect to the optical disk 3 is complete.

Figure 9:
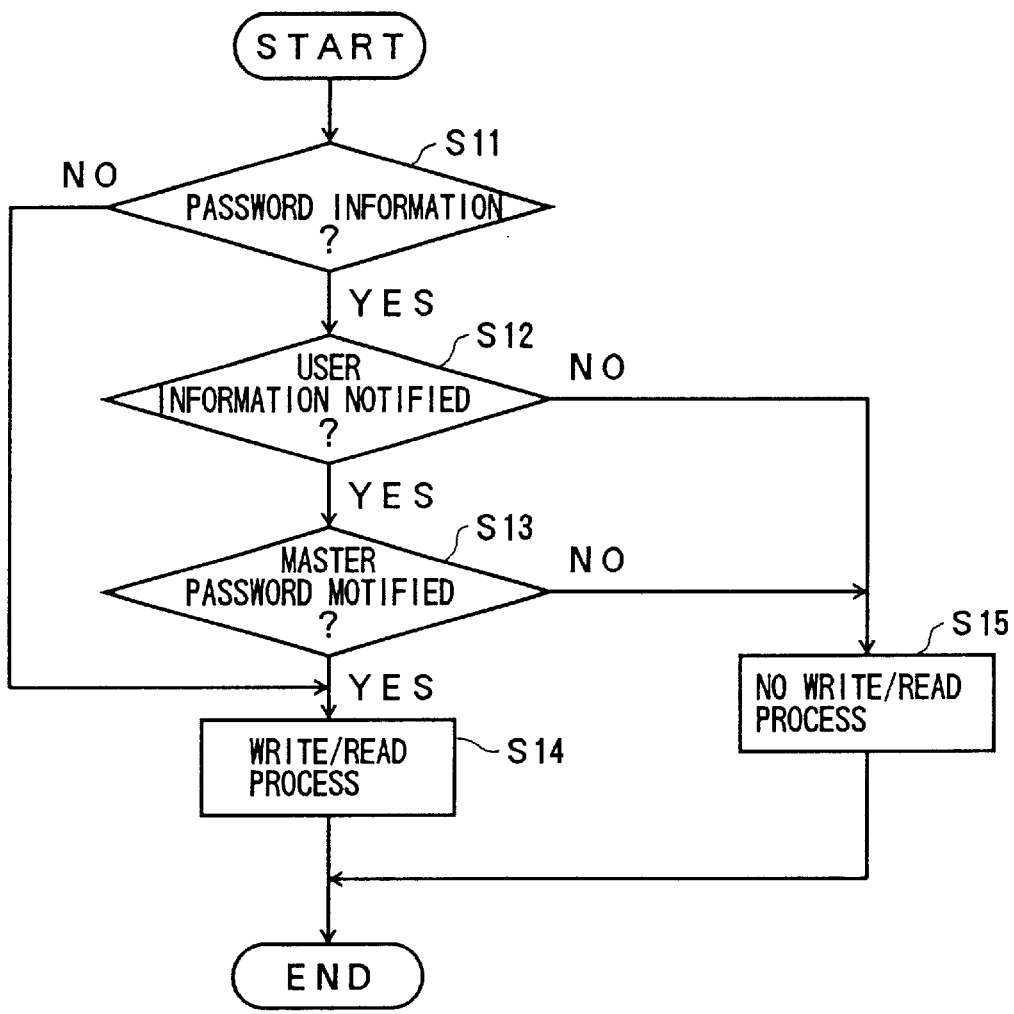
FIG. 9 is a flow chart for explaining the operation when executing a write/read command.

FIG. 9 is a flow chart for explaining the operation of this embodiment when executing a write/read command.

In FIG. 9, the MPU 12 decides in a step S11 whether or not password information read from the optical disk 3 exists. If the decision result in the step S11 is NO, it means that no security mechanism is provided in the optical disk 3, and the process advances to a step S14 which will be described later so as to carry out a write/read process. On the other hand, if the decision result in the step S11 is YES, the MPU 12 decides in a step S12 whether or not the user information, that is, the user password and the user name, read from the optical disk 3 are notified from the operator via the host unit 5. If the decision result in the step S12 is YES, the MPU 12 decides in a step S13 whether or not the master password read from the optical disk 3 is notified from the operator via the host unit 5. If the decision result in the step S13 is YES, the MPU 12 carries out the write/read process in the step S14 via the ODC 14 and the write LSI 20 or the read LSI 24, and the process ends. On the other hand, if the decision result in the step S12 or the step S13 is NO, the MPU 12 does not carry out a write/read process in a step S15, and the process ends.

Of course, the order in which the steps S12 and S13 are carried out may be reversed.

Therefore, according to this embodiment, after the password information including the master password and the user password is written in the optical disk 3, the drive unit 2 is notified of the master password and the user password written in the optical disk 3 from the host unit 5. Unless the write/read prohibit flag is set to "0" with respect to the user name, an abnormal end notification is made in response to an access command with respect to the optical disk 3, so as to prohibit access to the optical disk 3. On the other hand, the drive unit 2 is notified of the master password and the user password written in the optical disk 3 from the host unit 5, and permits access to the optical disk 3 in response to an access command with respect to the optical disk 3 if the write/read prohibit flag with respect to the user name is set to "0". As a result, it is possible to positively prevent unauthorized access to data and programs stored in the optical disk 3, by providing a simple mechanism with respect to the security of the data and the programs stored in the optical disk 3. Furthermore, by including the user name list in the user password, it is possible to manage the passwords in a relatively simple manner.

In the format of the master password, the user password and the user name list used in this embodiment, the master password and the user password are provided in common with respect to the users a, b, c and d as shown in FIGS. 5 and 7. The user password includes the user name list, and the write prohibit flag wtdis or the read prohibit flag rddis is set with respect to each of the user names a, b, c and d in the user name list.

However, as in the case of a first modification shown in FIG. 10, it is also possible to set both the write prohibit flag wtdis and the read prohibit flag rddis with respect to each of the user names a, b, c and d in the user name list. In this case, it is possible to independently set the write prohibit and the read prohibit with respect to each of the user names a, b, c and d.

In addition, as in the case of a second modification shown in FIG. 11, it is possible to separate the user password into a user write password and a user read password. In this case, it is unnecessary to provide the write prohibit flag wtdis and the read prohibit flag rddis, and the user write password and the user read password are provided in common with respect to each of the user names a, b and c. For example, the operator having the user name b is prohibited from making a write operation with respect to the optical disk 3 unless the user write password and the user name b are input to the drive unit 2. Similarly, the operator having the user name b is prohibited from making a read operation with respect to the optical disk 3 unless the user read password and the user name b are input to the drive unit 2.

Moreover, as in the case of a third modification shown in FIG. 12, it is possible to provide only one of the user write password and the user read password. For the sake of convenience, FIG. 12 shows a case where only the user write password is provided with respect to each of the user names a, b and c.

Figure 13:
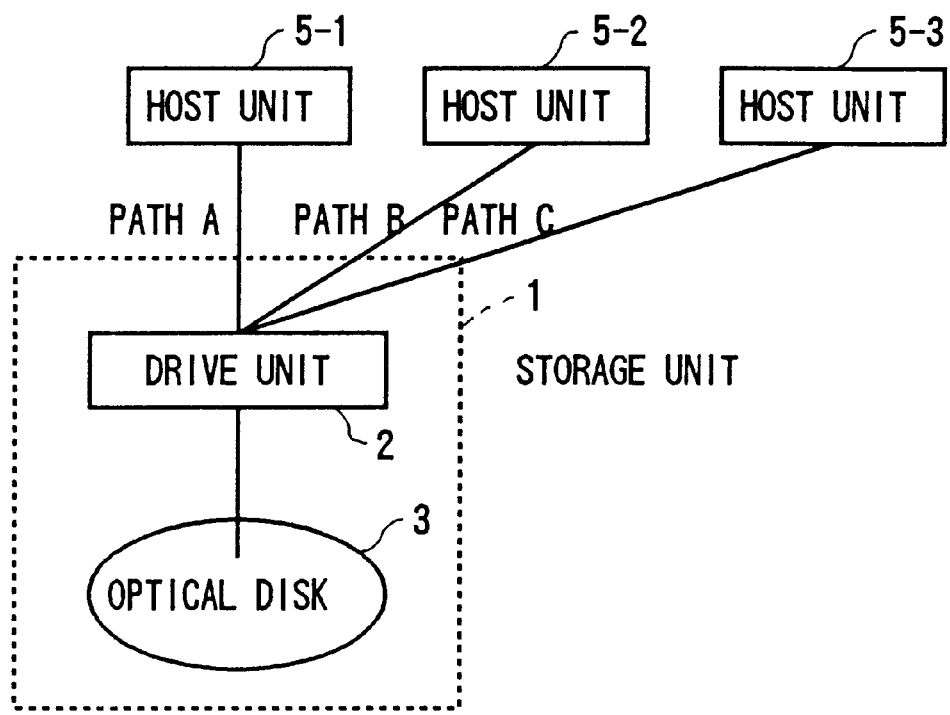
FIG. 13 is a system block diagram showing a second embodiment of the storage apparatus according to the present invention.

Next, a description will be given of a second embodiment of the storage apparatus according to the present invention, by referring to FIG. 13. FIG. 13 is a system block diagram showing the second embodiment of the storage apparatus. This second embodiment of the storage apparatus employs a second embodiment of the access control method according to the present invention, and creates a second embodiment of the storage medium according to the present invention. In this embodiment, the present invention is also applied to the optical disk unit which writes information on and/or reads information from an optical disk, that is, read/write information with respect to the optical disk. In FIG. 13, those parts which are the same as those corresponding parts in FIG. 1 are designated by the same reference numerals, and a description thereof will be omitted.

In FIG. 13, the storage apparatus 1 is coupled to a plurality of host units via independent paths. For the sake of convenience, this embodiment shows a case where three host units 5-1 through 5-3 are coupled to the storage apparatus 1 via corresponding paths A through C. The construction of the storage apparatus 1 shown in FIG. 13 is basically the same as that of the first embodiment described above in conjunction with FIGS. 2 and 3, except that the drive unit 2 has a plurality of ports for connecting to the plurality of paths A through C. More particularly, the interface 17 of the control unit 10 shown in FIG. 2 has three ports in this second embodiment, and these three ports are coupled to the host units 5-1 through 5-3 via the corresponding paths A through C.

Figure 14:
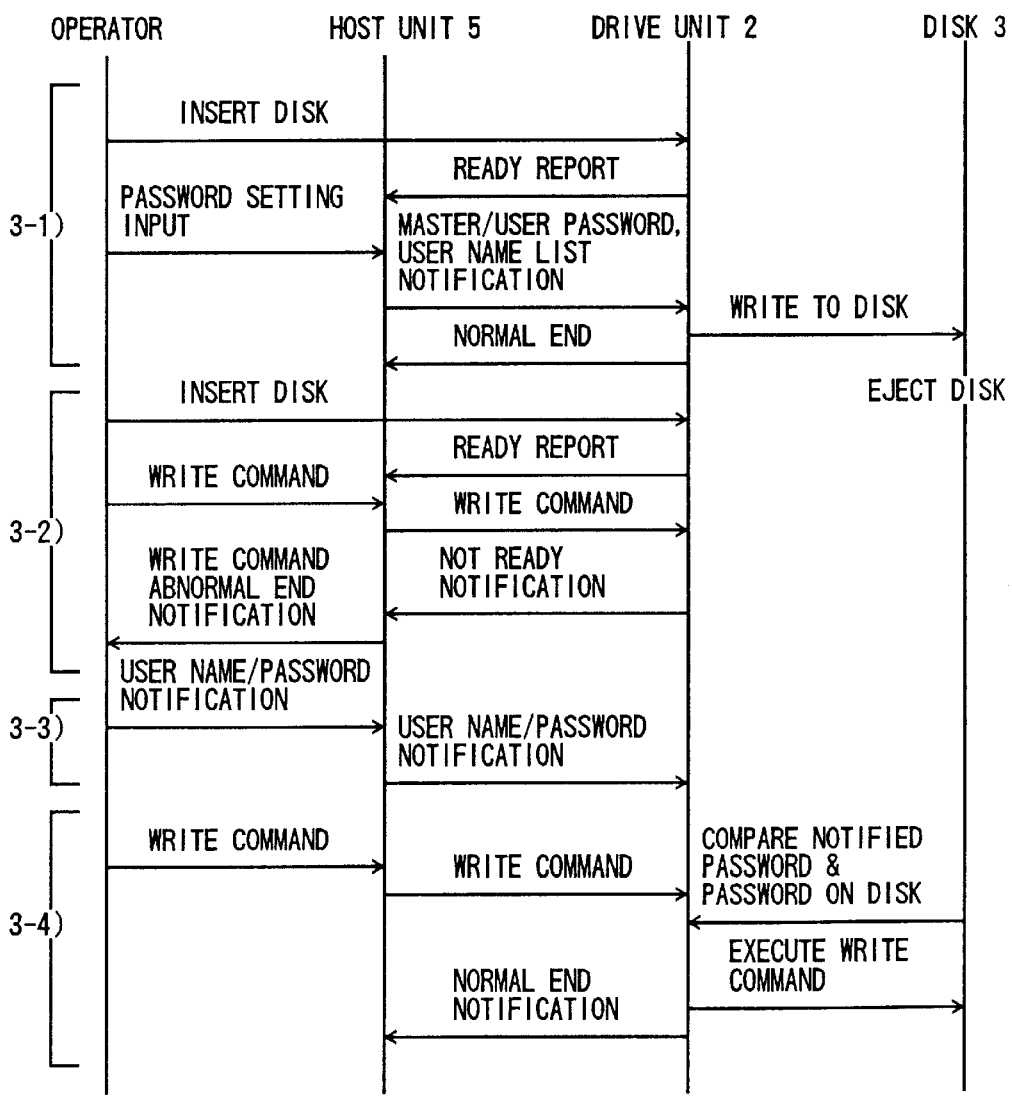
FIG. 14 is a time chart for explaining the operation of the second embodiment when carrying out a write operation.

Next, a description will be given of the operation of this embodiment during a write operation. FIG. 14 is a time chart for explaining the operation of this embodiment during the write operation. In FIG. 14, 3-1) shows a password setting operation, 3-2) shows an operation for a case where a write command is issued before the passwords are notified, 3-3) shows a password notifying operation, and 3-4) shows an operation for a case where the write command is issued after the passwords are notified. For the sake of convenience, it is assumed that the write command is issued from the host unit 5-1.

3-1) Password Setting Operation

When an operator inserts the optical disk 3 into the drive unit 2, the drive unit 2 supplies to the host unit 5-1 a ready signal which reports a ready state of the drive unit 2. When the operator confirms the ready state of the drive unit 2 on the host unit 5-1, the operator makes a password setting input. When making this password setting input, a security command for adding user information to a password is issued, and information such as a master password, a user password, a user name list and path information is input. The host unit 5-1 issues the security command, and supplies to the drive unit 2 the master password, the user password, the user name list, the path information and the like which are input. As a result, the drive unit 2 writes the master password, the user password, the user name list, the path information and the like in a region of the optical disk 3 other than a data region of the optical disk 3, and then reports a command normal end to the host unit 5-1. Thereafter, the optical disk 3 is ejected outside the storage apparatus 1 in response to an instruction from the operator or the host unit 5-1, for example.

The master password is provided to limit access to the optical disk 3, and a modification of the user password is permitted by specifying the master password. In addition, the user password is provided in common with respect to a plurality of users, and access to the data region of the optical disk 3 is permitted by specifying this user password. Prohibiting a write operation with respect to the data region is set with respect to each of the plurality of users and each of the paths.

FIG. 15 is a diagram for explaining a format of the master password, the user password, the user name list and the path information used in this embodiment. As shown in FIG. 15, the master password, the user password and the path information are provided in common with respect to users a, b, c and d. In addition, the user password includes the user name list, and a write prohibit flag wtdis is set with respect to each of the user names a through d. For example, the write prohibit flag wtdis is set to "1" with respect to the user who is to be prohibited from writing to the data region. Of course, the number of users is not limited to four. Further, in a case where the path information indicates the path A, for example, each of the users a, b, c and d is prohibited from writing to the data region unless a request is made to write via the path A, even if each of the users a, b, c and d satisfies the conditions of the master password and the user password.

3-2) Operation For A Case Where A Write Command Is Issued Before Passwords Are Notified When the operator inserts the optical disk 3 into the drive unit 2, the drive unit 2 supplies to the host unit 5-1 a ready signal which reports a ready state of the drive unit 2. When the operator confirms the ready state of the drive unit 2 on the host unit 5-1, the operator inputs a write command. As a result, the host unit 5-1 issues and supplies a write command to the drive unit 2. However, in this case, the passwords are not yet notified to the drive unit 2, and thus, the drive unit 2 notifies a not ready signal (abnormal end) to the host unit 5-1 with respect to the write command. As a result, the host unit 5-1 makes a write command abnormal end notification with respect to the operator by displaying a message, for example.

3-3) Password Notifying Operation

The operator inputs the master password, the user password and the user name from the keyboard of the host unit 5-1, for example. The host unit 5-1 notifies to the drive unit 2 the master password, the user password and the user name which are input. If the operator is the user b, for example, the user name b is input to the host unit 5-1 together with the master password and the user password.

3-4) Operation For A Case Where A Write Command Is Issued After Passwords Are Notified As described above under 3-2), when the operator inserts the optical disk 3 into the drive unit 2, the drive unit 2 supplies to the host unit 5-1 a ready signal which reports a ready state of the drive unit 2. When the operator confirms the ready state of the drive unit 2 on the host unit 5-1, the operator inputs a write command. As a result, the host unit 5-1 issues and supplies a write command to the drive unit 2. In this case, the passwords are already notified to the drive unit 2 by the operation described above under 3-3). Thus, the drive unit 2 compares the already notified passwords and the passwords read from the optical disk 3 to determine whether or not the passwords match, and compares the path information which is related to the path input by the write command and the path information read from the optical disk 3 to determine whether or not the two path information match, in response to the write command. If the compared passwords match, the two path information match, and no write prohibit is set, a write operation based on the write command is carried out with respect to the data region of the optical disk 3, and a command normal end is reported to the host unit 5-1. The comparison of the passwords includes a comparison of the master passwords, and a comparison of the user passwords. On the other hand, the comparison of the two path information includes a comparison of the path information which is obtained based on the port of the interface 17 via which the write command is input to the MPU 12 and the path information which is read from the optical disk 3. If the compared master passwords match, the compared user passwords match, and the compared path information match, a decision is made as to whether or not the write prohibit flag wtdis with respect to the user name is "0", and the write operation is permitted if the write prohibit flag wtdis is "0" while the write operation is prohibited if the write prohibit flag wtdis is "1".

Figure 16:
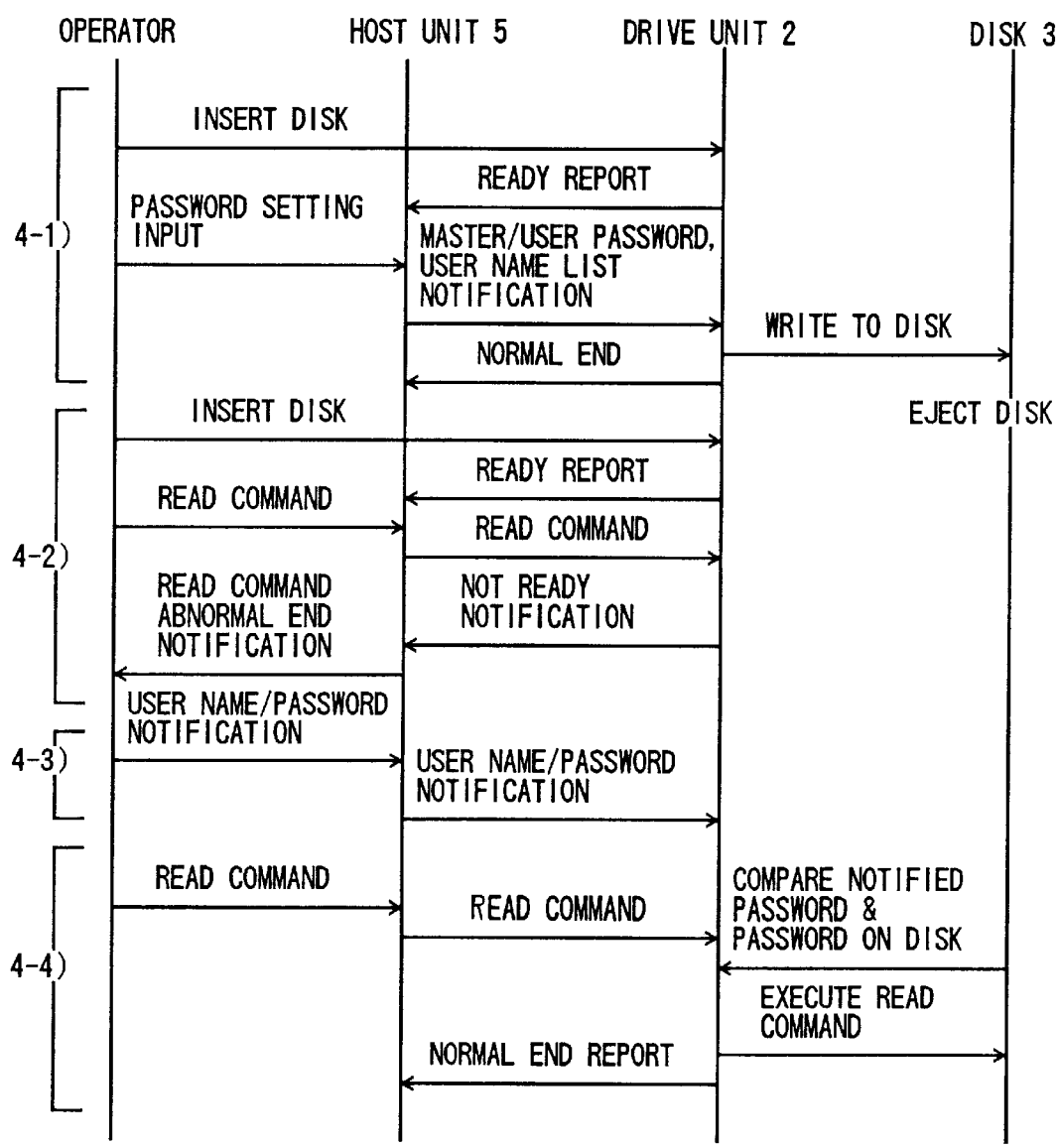
FIG. 16 is a time chart for explaining the operation of the second embodiment when carrying out a read operation.

Next, a description will be given of the operation of this embodiment during a read operation. FIG. 16 is a time chart for explaining the operation of this embodiment during the read operation. In FIG. 16, 4-1) shows a password setting operation, 4-2) shows an operation for a case where a read command is issued before the passwords are notified, 4-3) shows a password notifying operation, and 4-4) shows an operation for a case where the read command is issued after the passwords are notified.

4-1) Password Setting Operation

When an operator inserts the optical disk 3 into the drive unit 2, the drive unit 2 supplies to the host unit 5-1 a ready signal which reports a ready state of the drive unit 2. When the operator confirms the ready state of the drive unit 2 on the host unit 5-1, the operator makes a password setting input. When making this password setting input, a security command for adding user information to a password is issued, and information such as a master password, a user password, a user name list and path information is input. The host unit 5-1 issues the security command, and supplies to the drive unit 2 the master password, the user password, the user name list, the path information and the like which are input. As a result, the drive unit 2 writes the master password, the user password, the user name list, the path information and the like in a region of the optical disk 3 other than a data region of the optical disk 3, and then reports a command normal end to the host unit 5-1. Thereafter, the optical disk 3 is ejected outside the storage apparatus 1 in response to an instruction from the operator or the host unit 5-1, for example.

The master password is provided to limit access to the optical disk 3, and a modification of the user password is permitted by specifying the master password. In addition, the user password is provided in common with respect to a plurality of users, and access to the data region of the optical disk 3 is permitted by specifying this user password. Prohibiting a read operation with respect to the data region is set with respect to each of the plurality of users and each of the paths.

FIG. 17 is a diagram for explaining a format of the master password, the user password, the user name list and the path information used in this embodiment. As shown in FIG. 17, the master password, the user password and the path information are provided in common with respect to users a, b, c and d. In addition, the user password includes the user name list, and a read prohibit flag (read disable flag) rddis is set with respect to each of the user names a through d. For example, the read prohibit flag rddis is set to "1" with respect to the user who is to be prohibited from reading from the data region. Of course, the number of users is not limited to four. Further, in a case where the path information indicates the path A, for example, each of the users a, b, c and d is prohibited from reading from the data region unless a request is made to read via the path A, even if each of the users a, b, c and d satisfies the conditions of the master password and the user password.

4-2) Operation For A Case Where A Read Command Is Issued Before Passwords Are Notified When the operator inserts the optical disk 3 into the drive unit 2, the drive unit 2 supplies to the host unit 5-1 a ready signal which reports a ready state of the drive unit 2. When the operator confirms the ready state of the drive unit 2 on the host unit 5-1, the operator inputs a read command. As a result, the host unit 5-1 issues and supplies a read command to the drive unit 2. However, in this case, the passwords are not yet notified to the drive unit 2, and thus, the drive unit 2 notifies a not ready signal (abnormal end) to the host unit 5 with respect to the read command. As a result, the host unit 5-1 makes a read command abnormal end notification with respect to the operator by displaying a message, for example.

4-3) Password Notifying Operation

The operator inputs the master password, the user password and the user name from the keyboard of the host unit 5-1, for example. The host unit 5-1 notifies to the drive unit 2 the master password, the user password and the user name which are input. If the operator is the user b, for example, the user name b is input to the host unit 5-1 together with the master password and the user password.

4-4) Operation For A Case Where A Read Command Is Issued After Passwords Are Notified As described above under 4-2), when the operator inserts the optical disk 3 into the drive unit 2, the drive unit 2 supplies to the host unit 5-1 a ready signal which reports a ready state of the drive unit 2. When the operator confirms the ready state of the drive unit 2 on the host unit 5-1, the operator inputs a read command. As a result, the host unit 5-1 issues and supplies a read command to the drive unit 2. In this case, the passwords are already notified to the drive unit 2 by the operation described above under 4-3). Thus, the drive unit 2 compares the already notified passwords and the passwords read from the optical disk 3 to determine whether or not the passwords match, and compares the path information which is related to the path input by the read command and the path information read from the optical disk 3 to determine whether or not the two path information match, in response to the read command. If the compared passwords match, the two path information match, and no read prohibit is set, a read operation based on the read command is carried out with respect to the data region of the optical disk 3, and a command normal end is reported to the host unit 5-1. The comparison of the passwords includes a comparison of the master passwords, and a comparison of the user passwords. On the other hand, the comparison of the two path information includes a comparison of the path information which is obtained based on the port of the interface 17 via which the read command is input to the MPU 12 and the path information which is read from the optical disk 3. If the compared master passwords match, the compared user passwords match, and the compared path information match, a decision is made as to whether or not the read prohibit flag rddis with respect to the user name is "0", and the read operation is permitted if the read prohibit flag rddis is "0", while the read operation is prohibited if the read prohibit flag rddis is "1".

Figure 18:
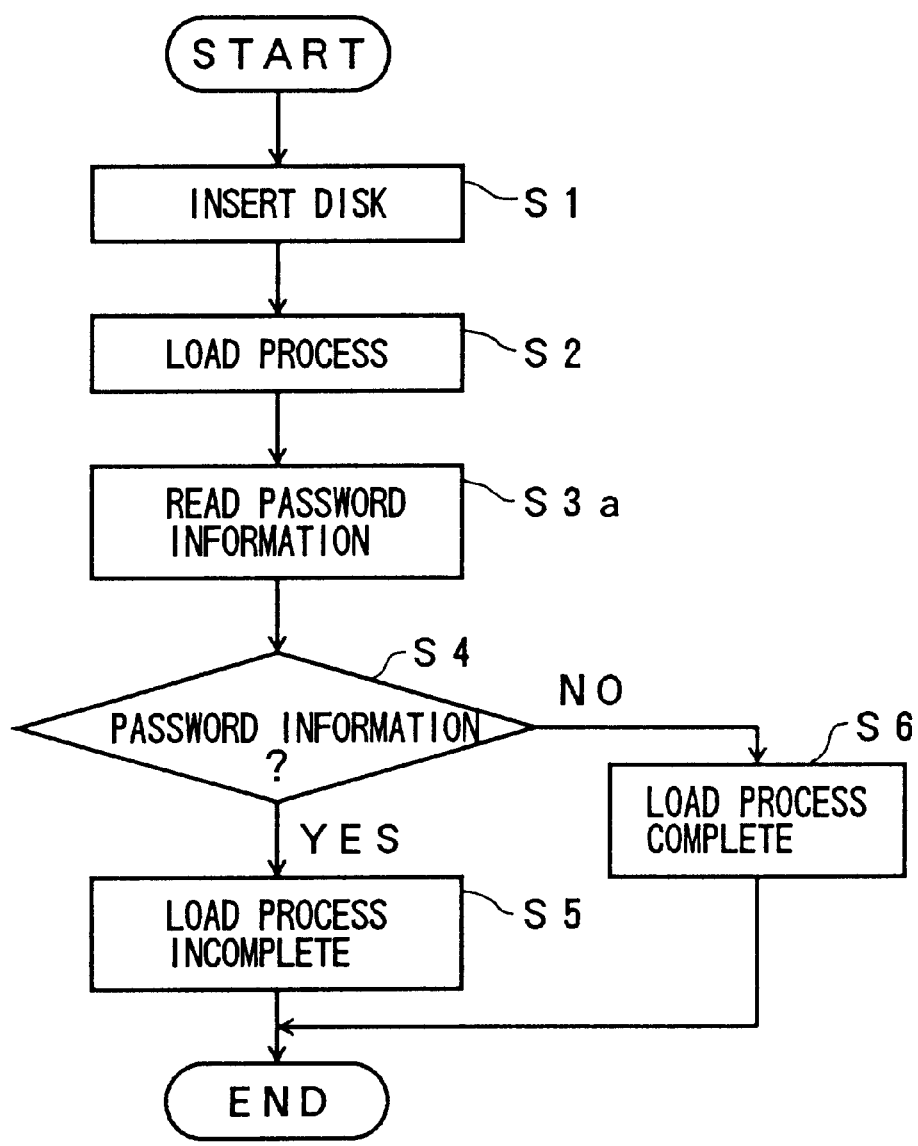
FIG. 18 is a flow chart for explaining the operation when inserting an optical disk into the storage apparatus.

FIG. 18 is a flow chart for explaining the operation of this embodiment when inserting the optical disk 3 into the storage apparatus 1. In FIG. 18, those steps which are the same as those corresponding parts in FIG. 8 are designated by the same reference numerals, and a description thereof will be omitted.

In a step S3a shown in FIG. 18, the MPU 12 reads password information from the optical disk 3 via the read LSI 24 and the ODC 14. The read password information includes the master password, the user password, the user name list, the path information and the like described above. Otherwise, the process shown in FIG. 18 is basically the same as that shown in FIG. 8.

Figure 19:
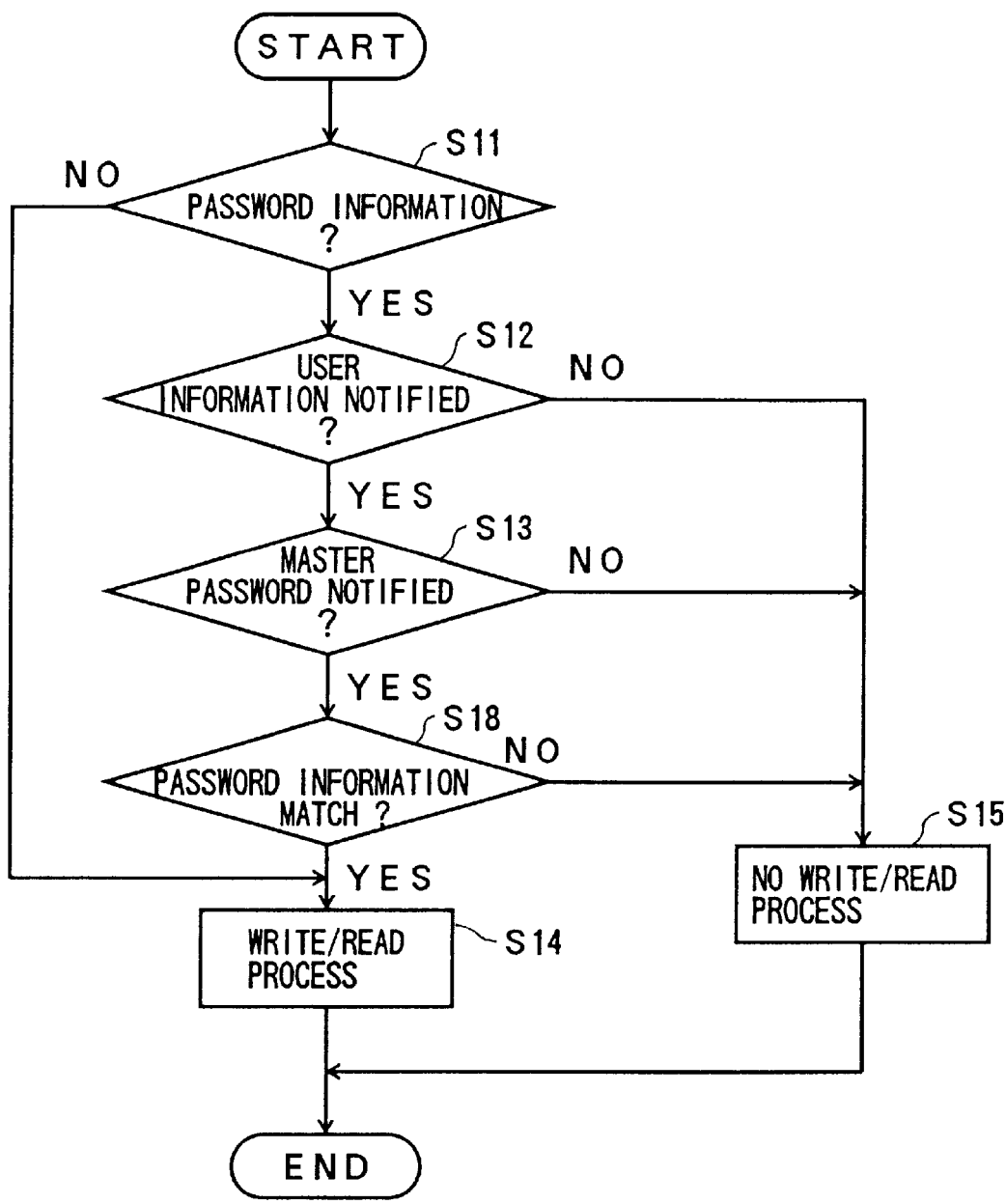
FIG. 19 is a flow chart for explaining the operation when executing a write/read command.

FIG. 19 is a flow chart for explaining the operation of this embodiment when executing a write/read command. In FIG. 19, those steps which are the same as those corresponding steps in FIG. 9 are designated by the same reference numerals, and a description thereof will be omitted.

In FIG. 19, if the decision result in the step S11 is YES, the MPU 12 decides in the step S12 whether or not the user information, that is, the user password and the user name, read from the optical disk 3 are notified from the operator via the host unit 5-1. If the decision result in the step S12 is YES, the MPU 12 decides in the step S13 whether or not the master password read from the optical disk 3 is notified from the operator via the host unit 5-1. If the decision result in the step S13 is YES, the MPU 12 decides whether or not the path information read from the optical disk 3 matches the path information which is obtained based on the port of the drive unit 2 via which the write/read command is input. If the decision result in the step S18 is YES, the MPU 12 carries out the write/read process in the step S14 via the ODC 14 and the write LSI 20 or the read LSI 24, and the process ends. On the other hand, if the decision result in the step S12, the step S13 or the step S18 is NO, the MPU 12 does not carry out a write/read process in the step S15, and the process ends. In other words, even in a case where the master password and the user password which are input respectively match those read from the optical disk 3, the access is not prohibited with respect to the user name b, for example, which is read from the optical disk 3, and this user b makes access to the optical disk 3, the access to the optical disk 3 is prohibited unless the user b makes the access via the path A, that is, unless the user b makes access from the host unit 5-1.

Of course, the order in which the steps S12, S13 and S18 are carried out may be reversed.

Therefore, according to this embodiment, after the password information including the master password, the user password and the path information is written in the optical disk 3, the drive unit 2 is notified of the master password and the user password written in the optical disk 3 from the host unit 5-1. Unless the path information written in the optical disk 3 matches the path information which is related to the path via which the access command is input, and the write/read prohibit flag is set to "0" with respect to the user name, an abnormal end notification is made in response to an access command with respect to the optical disk 3, so as to prohibit access to the optical disk 3. On the other hand, the drive unit 2 is notified of the master password and the user password written in the optical disk 3 from the host unit 5-1, and permits access to the optical disk 3 in response to an access command with respect to the optical disk 3, if the path information written in the optical disk 3 matches the path information which is related to the path via which the access command is input, and the write/read prohibit flag with respect to the user name is set to "0". As a result, it is possible to positively prevent unauthorized access to data and programs stored in the optical disk 3, by providing a simple mechanism with respect to the security of the data and the programs stored in the optical disk 3. Furthermore, by including the user name list in the user password and additionally providing the path information, it is possible to manage the passwords in a relatively simple manner.

In the format of the master password, the user password and the user name list used in this embodiment, the master password and the user password are provided in common with respect to the users a, b, c and d as shown in FIGS. 15 and 17. The user password includes the user name list, and the write prohibit flag wtdis or the read prohibit flag rddis is set with respect to each of the user names a, b, c and d in the user name list.

However, as in the case of a first modification shown in FIG. 20, it is also possible to set both the write prohibit flag wtdis and the read prohibit flag rddis with respect to each of the user names a, b, c and d in the user name list. In this case, it is possible to independently set the write prohibit and the read prohibit with respect to each of the user names a, b, c and d.

In addition, as in the case of a second modification shown in FIG. 21, it is possible to separate the user password into a user write password and a user read password. In this case, it is unnecessary to provide the write prohibit flag wtdis and the read prohibit flag rddis, and the user write password and the user read password are provided in common with respect to each of the user names a, b and c. For example, the operator having the user name b is prohibited from making a write operation with respect to the optical disk 3 unless the user write password and the user name b are input to the drive unit 2. Similarly, the operator having the user name b is prohibited from making a read operation with respect to the optical disk 3 unless the user read password and the user name b are input to the drive unit 2.

Moreover, as in the case of a third modification shown in FIG. 22, it is possible to provide only one of the user write password and the user read password. For the sake of convenience, FIG. 22 shows a case where only the user write password is provided with respect to each of the user names a, b and c.

The modifications shown in FIGS. 20 through 22 respectively correspond to the modifications shown in FIGS. 10 through 12 which are added with the path information.

In each of the embodiments and modifications described above, it is possible to encipher at least one of the master password and the user password when writing the master password and the user password in the optical disk 3. In this specification, a description of the enciphering technique will be omitted because various known techniques may be used for such an enciphering.

Further, the present invention is not limited to these embodiments, but various variations and modifications may be made without departing from the scope of the present invention.

What is claimed is:

1. An access control method for a storage apparatus which writes information on a portable storage medium in response to a request from at least one host unit, comprising the steps of:

writing on the portable storage medium a user password which limits access to the portable storage medium, and said user password is common to a plurality of users and permits access to a data region on the portable storage medium by specifying user information and the user password, and prohibits at least one of write and read with respect to each of the plurality of users according to the specified user information and user password, wherein said user information includes at least one of read permit information and write permit information.

2. The access control method as claimed in claim 1, wherein:

the storage apparatus is coupled to a plurality of host units via a plurality of paths, path information related to the paths is added to the user password, and access to the data region on the portable storage medium is permitted by specifying the user password and the path information.

3. The access control method as claimed in claim 1, wherein prohibiting at least one of the write and read is set independently with respect to each of the plurality of users.

4. An access control method for a storage apparatus which reads information from a portable storage medium in response to a request from at least one host unit, comprising the steps of:

reading from the portable storage medium a user password which limits access to the portable storage medium, and said user password is common to a plurality of users and permits access to a data region on the portable storage medium by specifying user information and the user password, and prohibits at least one of write and read with respect to each of the plurality of users according to the specified user information and user password, wherein said user information includes at least one of read permit information and write permit information.

5. The access control method as claimed in claim 1, wherein:

the storage apparatus is coupled to a plurality of host units via a plurality of paths, path information related to the paths is added to the user password, and across to the data region on the portable storage medium is permitted by specifying the user password and the path information.

6. The access control method as claimed in claim 4, wherein prohibiting at least one of the write and read us set independently with respect to each of the plurality of users.

7. A storage apparatus which writes information on a portable storage medium in response to a request form at least one host unit, comprising:

a writing unit for writing on the portable storage medium a user password which limits access to the portable storage medium; and an access control part which permits access to a data region on the portable storage medium by specifying user information and the user password which is common to a plurality of users, and prohibits at least one of write and read with respect to each of the plurality of users according to the specified user information and user passwords, wherein said user information includes at least one of read permit information and write permit information.

8. The storage apparatus as claimed in claim 7, wherein the storage apparatus is coupled to a plurality of host units via a plurality of paths, path information related to the paths is added to the user password, and access to the data region on the portable storage medium is permitted by specifying the user password and the path information.

9. The storage apparatus as claimed in claim 7, wherein prohibiting at least one of the write and read is set independently with respect to each of the plurality of users.

10. A storage apparatus which reads information from a portable storage medium in response to a request from at least one host unit, comprising:

a reading unit for reading from the portable storage medium user information and a user password which limit access to the portable storage medium; and an access control part which permits access to a data region on the portable storage medium by specifying the user information and the user password which is common to a plurality of users, and prohibits at least one of write and read with respect to each of the plurality of users according to the specified user information and user password, wherein said user information includes at least one of read permit information and write permit information.

11. The storage apparatus as claimed in claim 10, wherein the storage apparatus is coupled to a plurality of host units via a plurality of paths, path information related to the paths is added to the user password, and access to the data region on the portable storage medium is permitted by specifying the user password and the path information.

12. The storage apparatus as claimed in claim 10, wherein prohibiting at least one of the write and read is set independently with respect to each of the plurality of users.

13. A storage medium comprising:

a data region storing data; and a region other than said data region, storing at least one user information and a user password which limit access to the storage medium, and the user password is common to a plurality of users and permits access to a data region on the storage medium by specifying the user information and the user password, and prohibits at least one of write and read with respect to each of the plurality of users according to the specified user information and user password, wherein said user information includes at least one of read permit information and write permit information.

14. The storage medium as claimed in claim 13, wherein path information related to the path is added to the user password, and the user password and the path information are provided to permit access to said data region by specifying the user password and the path information.

15. The storage medium as claimed in claim 13, wherein prohibiting at least one of the write and read is set independently with respect to each of the plurality of users.

16. The access control method as claimed in claim 1, wherein said specified user information includes a flag for indicating an access right of a user.

17. The access control method as claimed in claim 4, wherein said specified user information includes a flag for indicating an access right of a user.

18. The storage apparatus as claimed in claim 7, wherein said specified user information includes a flag for indicating an access right of a user.

19. The access control method as claimed in claim 1, wherein said step of writing writes on the portable storage medium a master password which limits access to the portable storage medium, and a modification of the user password is permitted by specifying the master password.

20. The access control method as claimed in claim 4, wherein said step of writing writes on the portable storage medium a master password which limits access to the portable storage medium, and a modification of the user password is permitted by specifying the master password.

21. The access control method as claimed in claim 7, wherein said step of writing writes on the portable storage medium a master password which limits access to the portable storage medium, and a modification of the user password is permitted by specifying the master password.

22. The access control method as claimed in claim 10, wherein said step of writing writes on the portable storage medium a master password which limits access to the portable storage medium, and a modification of the user password is permitted by specifying the master password.

23. The access control method as claimed in claim 13, wherein said step of writing writes on the portable storage medium a master password which limits access to the portable storage medium, and a modification of the user password is permitted by specifying the master password.

* * * * *

UNITED STATES PATENT AND TRADEMARK OFFICE
CERTIFICATE OF CORRECTION

PATENT NO. : 6,738,877 B1  Page 1 of 1
DATED : May 18, 2004
INVENTOR(S) : Yamakawa et al.

It is certified that error appears in the above-identified patent and that said Letters Patent is hereby corrected as shown below:

<u>Column 19,</u>
Line 34, please delete "us" and insert -- is -- therefor.
Line 37, please delete "form" and insert -- from -- therefor.
Line 48, please delete "passwords," and insert -- password, -- therefor.

Signed and Sealed this

Twelfth Day of October, 2004

JON W. DUDAS
*Director of the United States Patent and Trademark Office*